United States Patent
Tsui (10) Patent No.: US 11,494,159 B2
(45) Date of Patent: Nov. 8, 2022

(54) SPEAKER WITH BROADCASTING MODE AND BROADCASTING METHOD THEREOF

(71) Applicant: Harman International Industries, Incorporated, Stamford, CT (US)

(72) Inventor: Chi Ho Tsui, Guangdong (CN)

(73) Assignee: Harman International Industries, Incorporated, Stamford, CT (US)

(*) Notice: Subject to any disclaimer, the term of this patent is extended or adjusted under 35 U.S.C. 154(b) by 120 days.

(21) Appl. No.: 16/858,450

(22) Filed: Apr. 24, 2020

(65) Prior Publication Data
US 2020/0341721 A1    Oct. 29, 2020

Related U.S. Application Data

(63) Continuation-in-part of application No. PCT/CN2019/084928, filed on Apr. 29, 2019.

(51) Int. Cl.
*G06F 3/16* (2006.01)
*H04R 3/12* (2006.01)

(52) U.S. Cl.
CPC ............. *G06F 3/165* (2013.01); *H04R 3/12* (2013.01); *H04R 2420/07* (2013.01)

(58) Field of Classification Search
CPC .. G06F 3/165; G06F 3/16; H04R 3/12; H04R 2420/07; H04R 9/06; H04R 5/02; H04R 2430/20; H04M 1/72412; H04M 1/6066
See application file for complete search history.

(56) References Cited

U.S. PATENT DOCUMENTS

| | | | |
|---|---|---|---|
| 7,089,333 B2 * | 8/2006 | Marinescu | H04R 27/00 709/248 |
| 8,433,243 B2 * | 4/2013 | Sharma | H04M 1/05 455/41.3 |
| 9,462,109 B1 * | 10/2016 | Frazier Fields | H04W 4/025 |

(Continued)

FOREIGN PATENT DOCUMENTS

| CN | 107040847 A | 8/2017 |
|---|---|---|
| CN | 109068232 A | 12/2018 |

(Continued)

OTHER PUBLICATIONS

European Patent Office, Extended European Search Report Issued in Application No. 20167170.8, dated Aug. 13, 2020, Germany, 12 pages.

(Continued)

*Primary Examiner* — Oyesola C Ojo
(74) *Attorney, Agent, or Firm* — McCoy Russell LLP (57) ABSTRACT

Systems and methods for broadcasting an audio stream to a plurality of speakers with a broadcasting mode. In one example, a method includes, responsive to a first speaker of a plurality of speakers receiving a first audio stream from a first audio device and a request to enter a broadcasting mode, operating the first speaker in a master sub-mode of a broadcasting mode by: re-broadcasting the first audio stream from the first audio device via a second speaker of the plurality of speakers operating in a slave sub-mode of the broadcasting mode, the second speaker not receiving the first audio stream from the first audio device. In this way, an audio stream from an audio device may be re-broadcasting to a plurality of speakers via a broadcasting mode.

17 Claims, 6 Drawing Sheets

(56) References Cited

U.S. PATENT DOCUMENTS

| | | | | |
|---|---|---|---|---|
| 9,820,323 | B1* | 11/2017 | Young | H04W 84/18 |
| 9,838,829 | B2* | 12/2017 | El-Hoiydi | H04L 1/1657 |
| 10,341,771 | B2* | 7/2019 | Park | H04R 29/001 |
| 11,095,982 | B2* | 8/2021 | Min | H04W 4/80 |
| 2008/0077261 | A1* | 3/2008 | Baudino | H04M 1/72412 |
| | | | | 700/94 |
| 2009/0154739 | A1* | 6/2009 | Zellner | H04R 3/00 |
| | | | | 381/311 |
| 2012/0058727 | A1* | 3/2012 | Cook | H04R 3/12 |
| | | | | 455/41.3 |
| 2012/0148075 | A1* | 6/2012 | Goh | H04S 7/301 |
| | | | | 381/303 |
| 2013/0251178 | A1* | 9/2013 | Yoon | H04R 5/02 |
| | | | | 381/307 |
| 2015/0055781 | A1* | 2/2015 | Chen | H04R 5/04 |
| | | | | 381/2 |
| 2017/0083284 | A1* | 3/2017 | Fisher | H04W 4/80 |
| 2017/0195769 | A1* | 7/2017 | Chang | H04R 1/1016 |
| 2018/0020400 | A1* | 1/2018 | Young | H04R 3/12 |

FOREIGN PATENT DOCUMENTS

| | | |
|---|---|---|
| WO | 2011031910 A1 | 3/2011 |
| WO | 2018098136 A1 | 5/2018 |

OTHER PUBLICATIONS

ISA National Intellectual Property Administration of the People's Republic of China, International Search Report and Written Opinion Issued in Application No. PCT/CN2019/084928, dated Dec. 30, 2019, WIPO, 10 pages.

* cited by examiner

SPEAKER WITH BROADCASTING MODE AND BROADCASTING METHOD THEREOF

CROSS REFERENCE TO RELATED APPLICATIONS

The present application is a continuation-in-part of International Application No. PCT/CN2019/084928 filed on Apr. 29, 2019. The entire contents of the above-identified application is incorporated by reference for all purposes.

FIELD

The present disclosure generally relates to broadcasting music to smart speakers.

BACKGROUND

Portable Bluetooth speakers are frequently used to increase flexibility and ease of interacting with a computerized device. For example, a portable Bluetooth speaker may be used to provide a voice-control interface with a device. As another example, a portable Bluetooth speaker may play music and other media (e.g., such as podcasts, audio books, and the like) for a user. As an example, a speaker may be connected to a smart device, such as a mobile phone, a tablet, a computer or an audio playing device, and the smart device may transmit the audio stream via Advanced Audio Distribution Profile (A2DP) and in order to reproduce the audio through the speaker. However, currently Bluetooth speaker designs may only allow one-to-one connections between smart devices and speakers, so that only a single Bluetooth speaker may reproduce the audio stream from the smart device. This limitation may reduce customer satisfaction and system flexibility.

SUMMARY

Embodiments are disclosed for an example method for transitioning a computing system, such as a speaker controller, between a broadcasting mode and a normal mode, the broadcasting mode including a master sub-mode and a slave sub-mode. The example method comprises: responsive to a first speaker of a plurality of speakers receiving a first audio stream from a first audio device and a request to enter a broadcasting mode, operating the first speaker in a master sub-mode of a broadcasting mode by: re-broadcasting the first audio stream from the first audio device via a second speaker of the plurality of speakers operating in a slave sub-mode of the broadcasting mode, the second speaker not receiving the first audio stream from the first audio device.

In another embodiment, an example method for a computing system comprises: transitioning between operating a speaker in a normal mode and operating the speaker in a broadcasting mode, the broadcasting mode including a master sub-mode and a slave sub-mode.

Systems for a computing system (e.g., such as a speaker controller) are also disclosed. An example computing system comprises: a first speaker; a processor communicatively coupled to the computing system; and a storage device storing instructions executable by the processor to: responsive to operating in a master sub-mode of a broadcasting mode, re-broadcasting an audio stream from an audio device to a second speaker, the second speaker not communicatively coupled to the audio device; and responsive to operating in a slave sub-mode of the broadcasting mode, acquiring the audio stream from a third speaker, the third speaker receiving the audio stream from the audio device.

BRIEF DESCRIPTION OF THE DRAWINGS

The disclosure may be better understood from reading the following description of non-limiting embodiments, with reference to the attached drawings, wherein below.

DETAILED DESCRIPTION OF THE DRAWINGS

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

As can be understood by those skilled in the art, a speaker will be described as a speaker including a computing device (e.g., a speaker controller) which may participate in a multi-speaker system. For example, a plurality of speakers, each including a speaker controller, may be networked together in order to reproduce an audio stream from an audio device (e.g., such as a mobile phone). Thus, one of the objects of the present disclosure is to provide a speaker with a broadcasting mode for re-broadcasting the audio stream from the speaker connecting to the audio playing device to multiple portable speakers, so as to reproduce the audio on all the speakers in the system. For example, providing a speaker with a broadcasting mode for re-broadcasting the audio stream to additional speakers may increase system flexibility and customer satisfaction. Further, by broadcasting the single audio stream to multiple speakers, sound distribution in an enclosed space may be increased, such as by allowing multiple speakers to simultaneously reproduce a single audio stream, via a single audio stream transmitted from an audio device to a speaker operating in a master sub-mode of a broadcasting mode via a Bluetooth connection.

Figure 1:
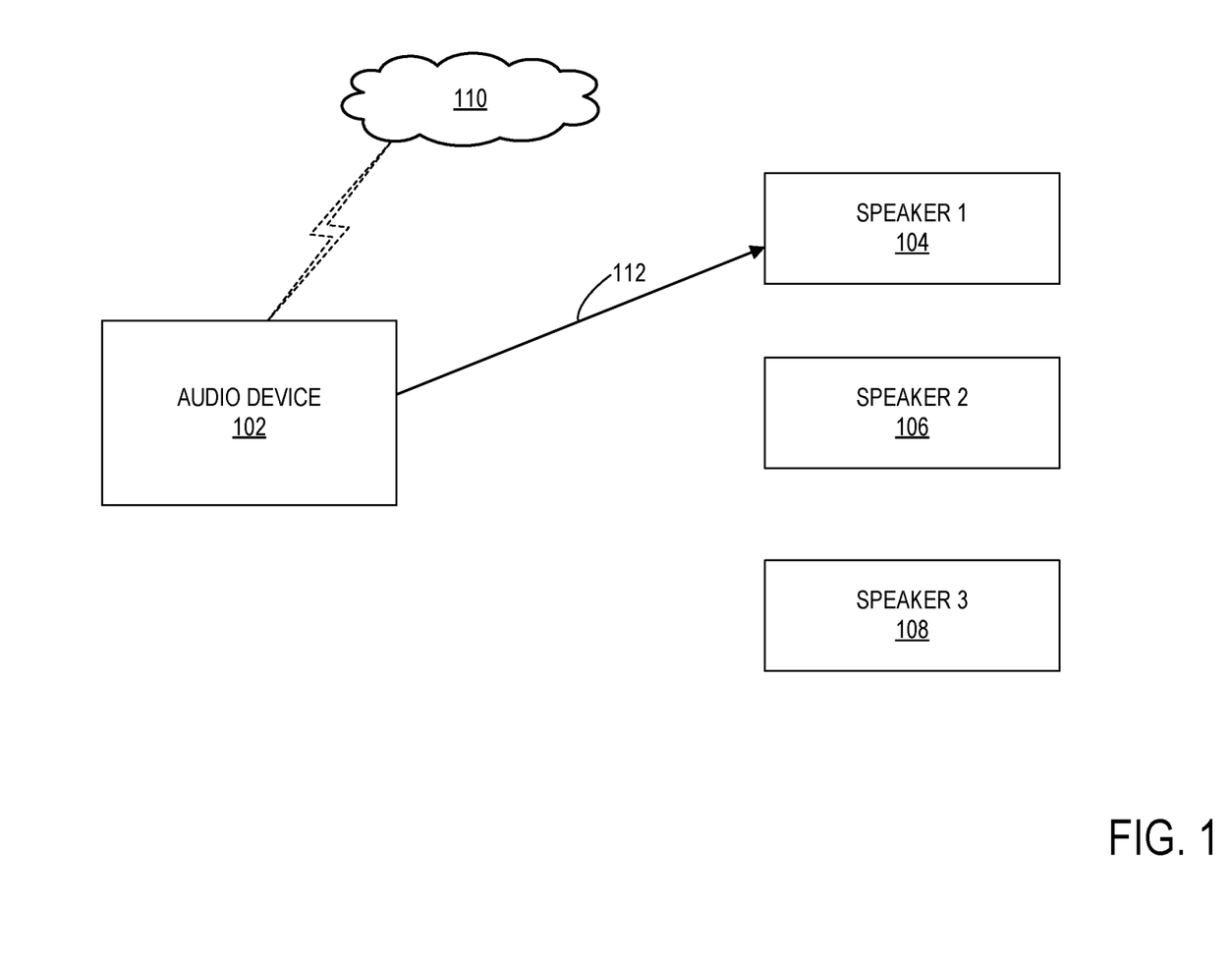
FIG. 1 is a schematic diagram illustrating a speaker operating in a normal mode.
Figure 2:
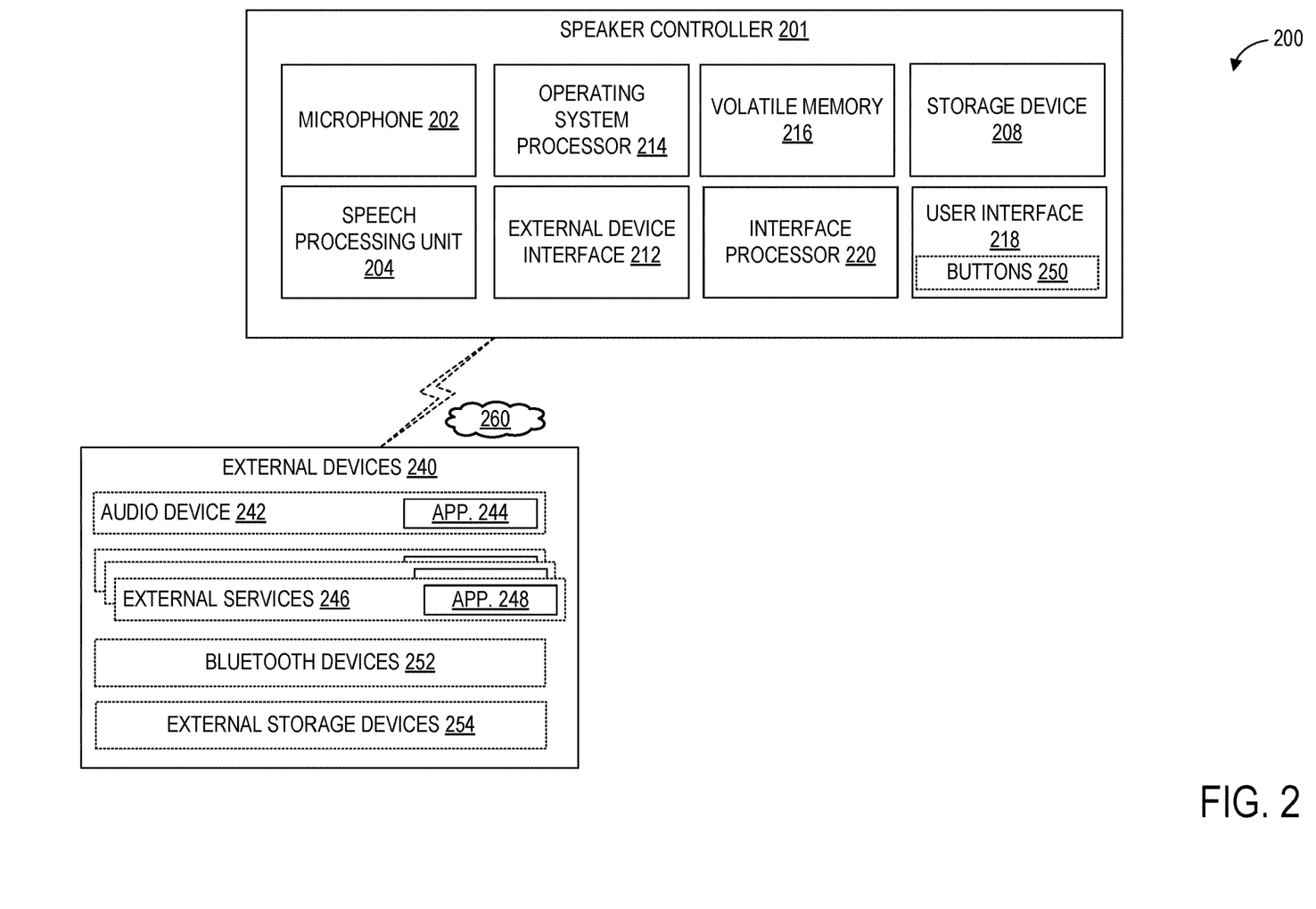
FIG. 2 is a schematic diagram illustrating a speaker controller for the speaker according to an embodiment of the present disclosure.
Figure 3:
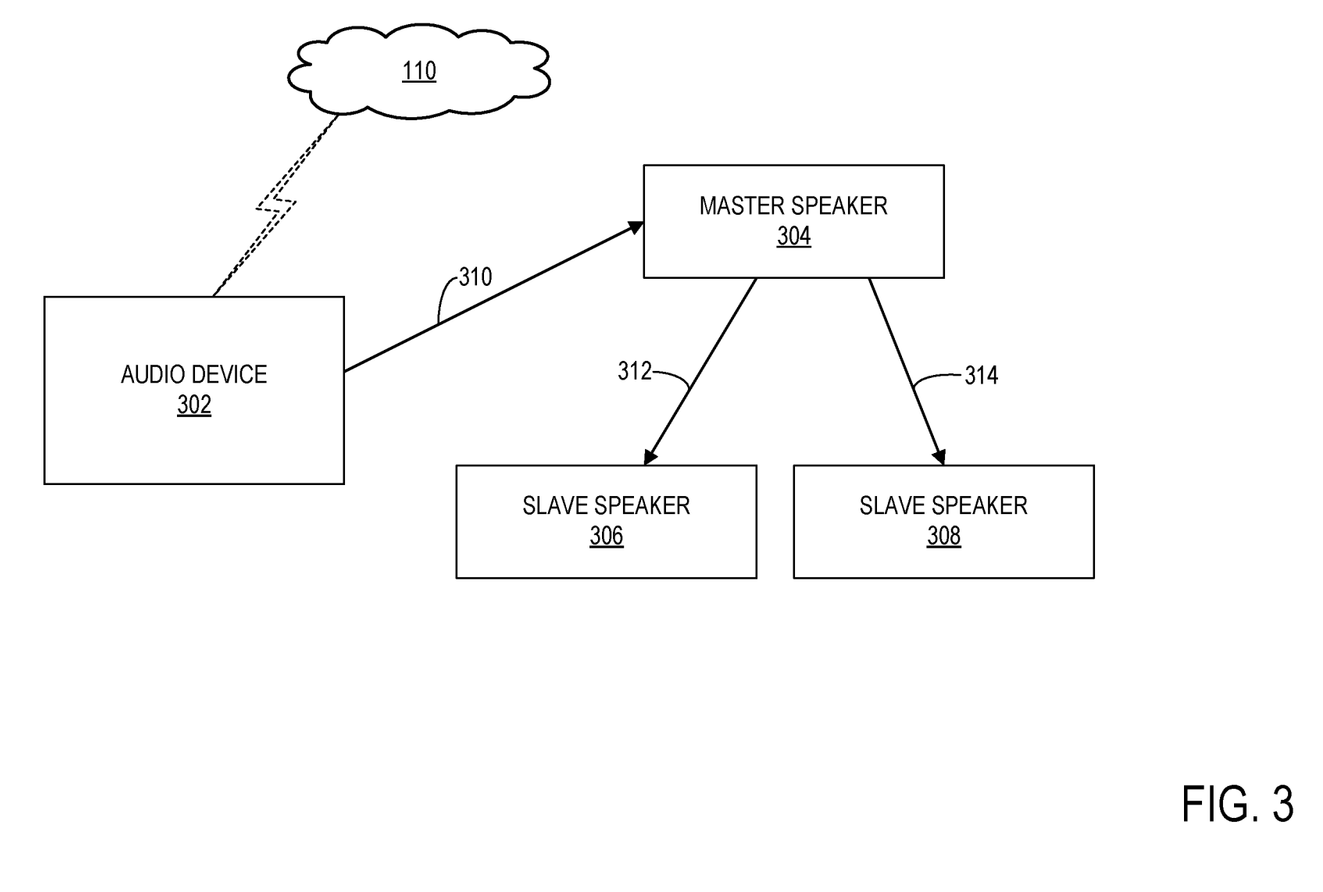
FIG. 3 is a schematic diagram illustrating a plurality of speakers operating in the broadcasting mode, according to an embodiment of the present disclosure.
Figure 4:
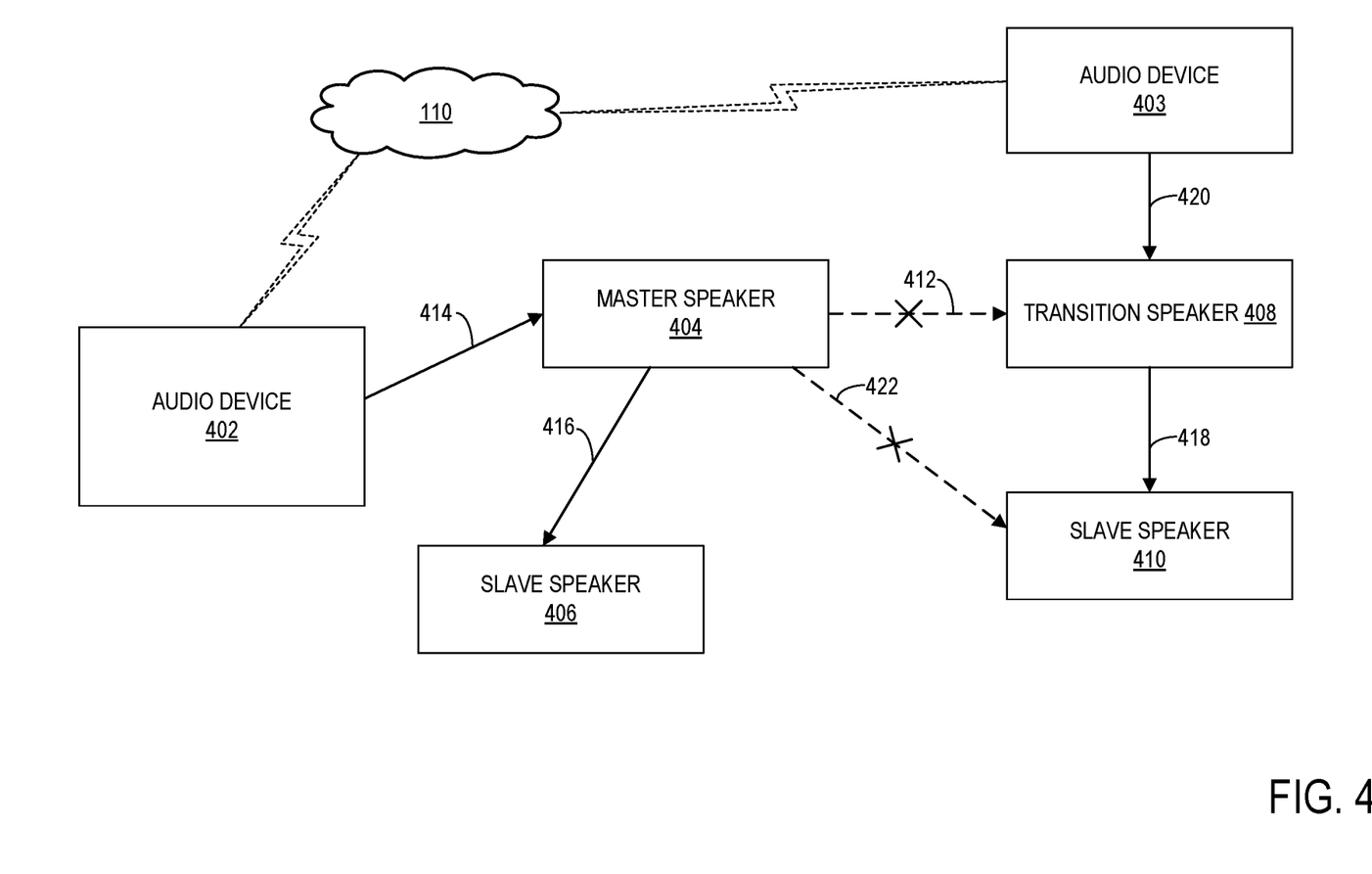
FIG. 4 is a schematic diagram illustrating a plurality of speakers operating in the broadcasting mode, according to another embodiment of the present disclosure.
Figure 5:
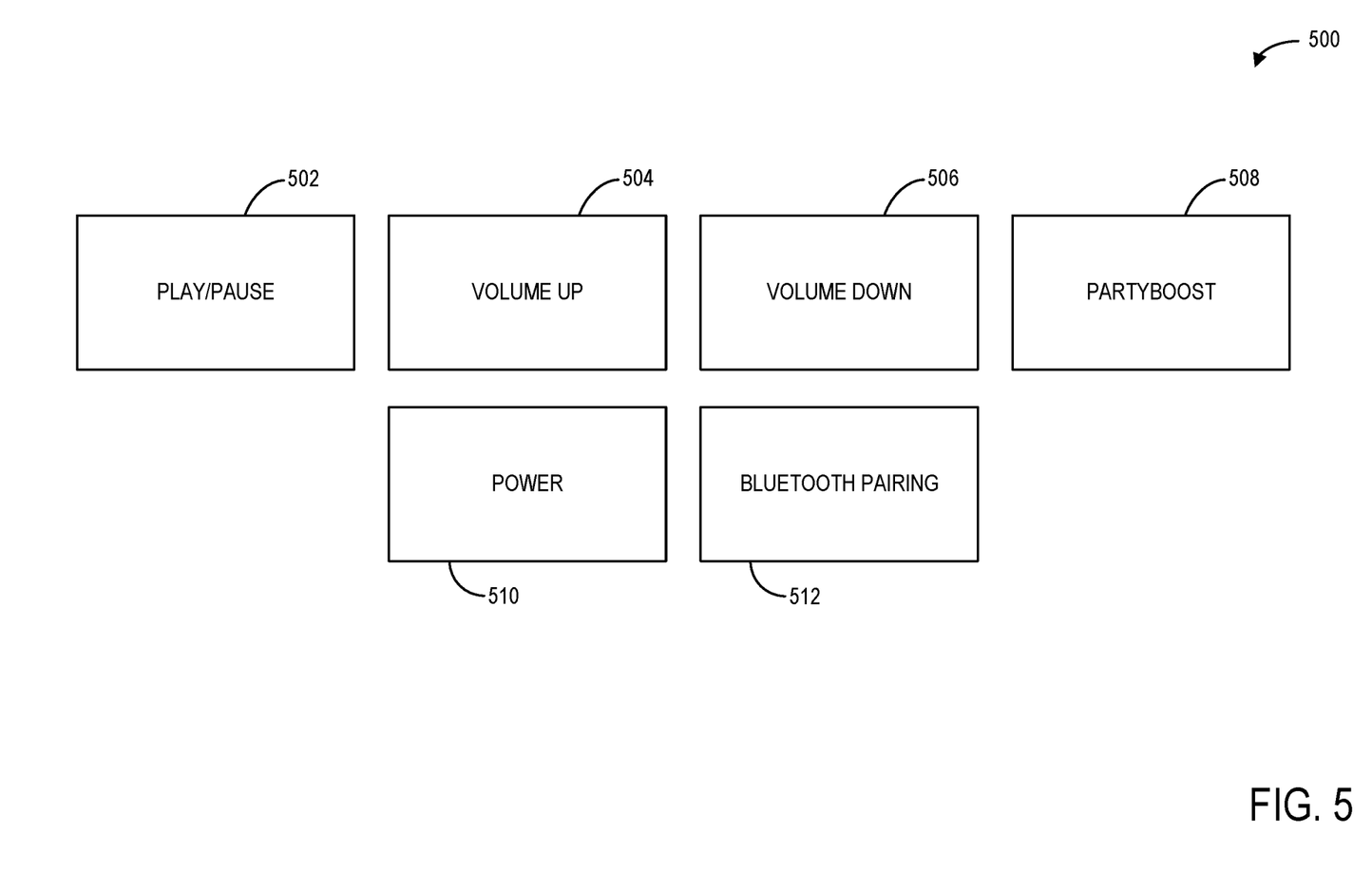
FIG. 5 is a schematic diagram illustrating one example button layout of the speaker according to an embodiment of the present disclosure.

First, FIG. 1 shows a schematic representation of a speaker system operating in a normal mode, in order to play audio transmitted by an audio device (e.g., such as a smart phone) to a first speaker via Bluetooth. Each speaker of the speaker system may include a speaker controller, such as shown in FIG. 2, for interfacing with external devices and receiving user inputs. Further, the speaker system may be operated in a broadcasting mode, as shown in FIGS. 3 and 4. For example, when operating in the broadcasting mode, the first speaker may be assigned as a master speaker, and other speakers may be assigned as slave speakers. Further, the first speaker may include a plurality of control buttons for receiving user inputs, as shown in FIG. 5. For example, the first speaker may transition between operation modes based on user inputs received via the plurality of control buttons and whether the first speaker receives an audio stream, according to the method of FIG. 6.

Referring to FIG. 1, a schematic example of an audio device transmitting an audio stream to a speaker is shown, the speaker operating in a normal mode according to an embodiment of the present disclosure. As such, FIG. 1 shows an audio device 102, such as one of a smart phone, a laptop computer, a smart watch, a tablet computer, and the like. Further, speaker system 101 includes a first speaker 104 (e.g., speaker 1), a second speaker 106 (e.g., speaker 2), and a third speaker 108 (e.g., speaker 3). Each of the first speaker 104, the second speaker 106, and the third speaker 108 may comprise a computing device for carrying out any of the methods described herein, such as method 600 of FIG. 6. As shown in FIG. 1, the first speaker 104 is communicatively coupled to audio device 102 via a connection 112. For example, audio device 102 may be communicatively coupled to a remote server 110 via a wireless connection, such as a music streaming server. Thus, audio device 102 may broadcast audio to the first speaker via connection 112, and the first speaker may play the transmitted audio, such as an Advanced Audio Distribution Profile (A2DP) audio stream. Further, the audio device 102 may not broadcast audio to each of the second speaker 106 and the third speaker 108. Arrow lines represent direct communication links, such as connection 112. Devices shown in FIG. 1 not connected by arrow lines are not in direct communication. For example, the second speaker 106 and the third speaker 108 are not in direct communication, while the audio device 102 and the first speaker 104 are in direct communication. As described, connection 112 may be a Bluetooth connection, and may enable bi-directional communication between audio device 102 and speaker 104.

In order to illustrate speaker operation according to the present disclosure, FIG. 2 shows a block diagram 200 of a speaker controller 201, such as may be included in each of the first speaker 104, the second speaker 106, and the third speaker 106 of FIG. 3. For example, the speaker controller 201 is a computing system, and may be coupled to one or more external devices 240. Speaker controller 201 may perform one or more of the methods described herein as embodiments. In some examples, the computing system may be configured to provide audio to a speaker user. Speaker controller 201 may include one or more processors including an operating system processor 214 and an interface processor 220. Operating system processor 214 may execute an operating system on the computing system, and control input/output, display, playback, and other operations of the speaker controller. Interface processor 220 may interface with a user via a user interface 218. For example, user interface 218 may include a plurality of buttons 250.

Speaker controller 201 may include a non-volatile storage device 208 to store data such as instructions executable by processors 214 and 220 in non-volatile form. For example, a storage device 208 may store application data to enable the speaker controller 200 to run an application for connecting to a cloud-based server and/or collecting information for transmission to a cloud-based server 260. The application may retrieve information gathered by input devices (e.g., user interface 218), devices in communication with the speaker controller (e.g., an audio device connected via a Bluetooth link), etc. Speaker controller 201 may further include a volatile memory 216. For example, the volatile memory 216 may be random access memory (RAM). Non-transitory storage devices, such as the non-volatile storage device 208 and/or the volatile memory 216, may store instructions and/or code that, when executed by a processor (e.g., operating system processor 214 and/or interface processor 220), controls the speaker to perform one or more of the methods described in the present disclosure, such as method 600 of FIG. 6.

A microphone 202 may be included in the speaker controller 201 to receive voice commands from a user, to measure ambient noise near the speaker, to determine whether audio from the user is tuned in accordance with an acoustic environment of the speaker, etc. A speech processing unit 204 may process voice commands, such as the voice commands received from the microphone 202.

Further, external device interface 212 of speaker controller 201 may be coupleable to and/or communicate with the one or more external devices 240 located external to the speaker. The external devices 240 may include an audio device 242 (e.g., connected via a Bluetooth, NFC, WIFI direct, or other wireless connection) or alternate Bluetooth-enabled devices 252. For example, the alternate Bluetooth-enabled devices 252 may be other speakers including a speaker controller. Audio device 242 may be a mobile phone, a smart phone, a laptop computer, smart glasses, an MP3 player, a smart television, wearable devices/sensors that may communicate with the computing system via wired and/or wireless communication, or other portable electronic device(s). For example, audio device 242 may be used as audio device 102 of FIG. 1. Other external devices include external services 246. Still other external devices include external storage devices 254, such as solid-state drives, pen drives, USB drives, etc. Further, the external services 246 may include cloud-based servers, such as a music streaming service or a podcast database.

External devices 240 may communicate with speaker controller 201 either wirelessly or via connectors without departing from the scope of this disclosure. For example, external devices 240 may communicate with speaker controller 201 through the external device interface 212 over network 260, a universal serial bus (USB) connection, a direct wired connection, a direct wireless connection, and/or other communication link. For example, the network 260 may comprise a Bluetooth connection between the audio device 242 and the speaker controller 201, in addition to a wireless connection between audio device 242 and external services 246. Further, speaker controller 201 may wirelessly interface with other Bluetooth speakers via external device interface 212 in order to broadcast or receive an audio stream, as will be elaborated below with respect to FIGS. 3 and 4.

One or more applications 244 may be operable on audio device 242. As an example, audio device application 244 may be operated to provide an audio stream (e.g., A2DP) to speaker controller 201. For example, a user may select one or more audio files, such as a song, a playlist, an album, and the like, and the audio device 242 may stream the audio to the speaker controller 201 via the Bluetooth connection (e.g., network 260). In addition, specific user data requests may be received at audio device 242 from speaker controller 201 via the external device interface 212, such as a volume adjustment. Likewise, one or more applications 248 may be operable on external services 246.

Further, a speaker controller, such as speaker controller 201 of FIG. 2, may transition a speaker between a plurality of operating modes, including a normal mode, a broadcasting mode, and a transient mode. The broadcasting mode may include a master sub-mode and a slave sub-mode, as will be elaborated below with respect to FIGS. 3 and 4. Returning briefly to FIG. 1, each of the first speaker 104 the second speaker 106, and the third speaker 108 is shown operating in a normal mode. For example, in the example of FIG. 1, only one speaker (speaker 1) of the three speakers shown (e.g., speaker 1, speaker 2, and speaker 3) is connected to the audio device 102 via the connection 112 and is receiving and reproducing the A2DP audio stream taken from the audio device 102. Because each of the second speaker 106 and the third speaker 108 is not connected to the audio device 102, the second speaker and the third speaker do not receive and reproduce the A2DP audio stream. For example, the speaker may operate in the normal mode by default upon starting the device. By way of example, a speaker operating in the normal mode operates as a standalone speaker. When a speaker operating in the normal mode receives an audio stream from an audio device, it may reproduce the audio stream. For example, the speaker may be paired with the audio device (e.g., such as via Bluetooth connection). However, when a speaker operating in the normal mode does not receive an audio stream from an audio device, it may not reproduce the audio stream.

By contrast, a speaker operating in the broadcasting mode may be in communication with at least one other speaker. For example, while operating in either the master sub-mode or the slave sub-mode of the broadcasting mode, an audio stream from an audio device may be rebroadcasted from a speaker connected to the audio device to a plurality of speakers so as to reproduce the audio stream on all the speakers substantially simultaneously. A speaker may be transitioned between operating in the normal mode and operating in the broadcasting mode based on input from a button, as will be elaborated below with respect to FIG. 6. For example, based on input from a button and an audio streaming status (e.g., whether the speaker is receiving an audio stream from an audio device), the speaker operating in the normal mode may transition either to a broadcasting role (e.g., operating in the sub-mode of the broadcasting mode) or a receiver role (e.g., operating in the slave sub-mode of the broadcasting mode). As a first example, responsive to input from a button, a speaker paired with a smart phone with audio streaming (e.g., an audio device) may be assigned the broadcasting role as a master speaker in the system (e.g., may operate in the master sub-mode); the speakers not paired to a smart phone providing audio streaming may be assigned receiver role as slave speakers (e.g., may operate in the slave sub-mode). For example, in each of the master sub-mode and the slave sub-mode, there may be one master speaker in the broadcasting system which may connect to multiple slave speakers, and thus the master speaker may re-broadcast the audio stream (e.g., such as an A2DP audio stream) from this master speaker to multiple slave speakers, so as to reproduce the audio on all the speakers.

Therefore, FIGS. 3 and 4 show example speakers operating in the broadcasting mode. In FIGS. 3 and 4, direct communication lines between devices are shown by arrows. For example, devices shown connected by arrows may be in direct communication, while devices not shown connected by arrows may not be in direct communication. First, FIG. 3 shows a schematic diagram of a plurality of speakers according to an embodiment of the present disclosure. As such, FIG. 3 shows a master speaker 304 operating in the master sub-mode of the broadcasting mode, a slave speaker 306 operating in the slave sub-mode of the broadcasting mode, and a slave speaker 308 operating in the slave sub-mode of the broadcasting mode, as provided in the present disclosure. In particular, the master speaker 304 is communicatively coupled to an audio device 302 via a connection 310. Audio device 302 may acquire audio from a remote server 110, or may have audio stored in non-volatile device memory. Further, the slave speaker 306 is communicatively coupled to the master speaker 304 via a connection 312, and the slave speaker 308 is communicatively coupled to the master speaker 304 via a connection 314. Further, additional slave speakers (e.g., speakers operating in the slave sub-mode of the broadcasting mode), not shown in FIG. 3, may be communicatively coupled to master speaker 304. For example, the connection between master speaker 304, slave speaker 306, and slave speaker 308 may be a proprietary protocol based on Bluetooth Low Energy (BLE), as defined by the applicant. While operating in the master broadcasting mode, master speaker 304 acquires an audio stream (e.g., such as A2DP) from audio device 302 via the connection 310, and re-broadcasts the audio stream from the audio device to slave speaker 306 and slave speaker 308.

Thus, while operating in the slave sub-mode of the broadcasting mode, the slave speakers (e.g., slave speaker 306 and slave speaker 308) receive the re-broadcasted audio stream from master speaker 304, and play the audio stream. While audio device 302 continues to broadcast the audio stream and remains within range for the connection 310, the master speaker 304 may continue to receive the A2DP audio stream from audio device 302 and re-broadcast the audio stream to the slave speaker 306 and the slave speaker 308. As an example, in the embodiment shown in FIG. 3, each of the speakers may be defined beforehand as a master speaker or a slave speaker, such as by using such as a smartphone app or a pre-determined button press combination on each of the speakers. For example, which of the speakers operates in the master sub-mode and which operates in the slave sub-mode may be pre-determined, and may not be adjusted during operation. For example, as long as master speaker 304 receives the audio stream from audio device 302, master speaker 304 may continue to operate in the master sub-mode and broadcast the audio stream to each of the slave speaker 306 and the slave speaker 308. However, in some examples, each of the speakers (e.g., the master speaker 304, the slave speaker 306, and the slave speaker 308) may automatically transition between the master role (e.g., operating in the master sub-mode of the broadcasting mode) and the slave role (e.g., operating in the slave sub-mode of the broadcasting mode) based on a connection with the audio device, such as according to method 600 of FIG. 6.

Therefore, FIG. 4 shows a schematic diagram of a plurality of speakers operating in the broadcasting mode, including automatically transitioning between sub-modes of the broadcasting mode, according to another embodiment of the present disclosure. In particular, as shown in FIG. 4, each speaker may transition between operating in the master sub-mode and the slave sub-mode. FIG. 4 shows a first audio device 402 and a second audio device 403, each of the first audio device and the second audio device communicatively coupled to a remote servicer 110, which may provide an audio stream to each of the first audio device and the second audio device. Further, the first audio device 402 is communicatively coupled to a first master speaker 404 via a connection 414. As shown in FIG. 4, the first audio device 402 may provide an audio stream to master speaker 404 via the connection 414. Because the first audio device receives the audio stream from the audio device, it may operate in the master sub-mode of the broadcasting mode. For example, because the first master speaker 404 operates in the master sub-mode of the broadcasting mode, the master speaker 404 may rebroadcast a slave speaker 406 via a connection 416. For example, connections between speaker devices (e.g., such as connection 416) may be Bluetooth connections, such as the proprietary protocol based on BLE. Because the first audio device does not provide an audio stream to the slave speaker 406, the slave speaker continues to operate in the slave sub-mode, and reproduces the audio stream re-broadcasted by the master speaker 404 via connection 416.

Further, FIG. 4 shows speakers operating in the broadcasting mode after at least one speaker transitions between operating in the master sub-mode and the slave sub-mode in response to receiving an audio stream from an audio device. For example, master speaker 404 may have previously provided an audio stream to a transition speaker 408 via a terminated connection 412, and to slave speaker 410 via a terminated connection 422. Further, while receiving the audio stream from master speaker 404, the transition speaker 408 may have operated in the slave sub-mode. However, as the second audio device 403 initiates an audio stream to the transition speaker 408 via a connection 420, the transition speaker 408 may transition from operating in the slave sub-mode of the broadcasting mode to operating in the master sub-mode of the broadcasting mode. As such, the transition speaker 408 may start transmitting audio from the second audio device 404 to the slave speaker 410 via a connection 418, so that a connection between slave speaker 410 and master speaker 404 is terminated (e.g., terminated connection 422), and connection 418 between the transition speaker 408 and the slave speaker 410 is established.

Said differently, the transition speaker 408 may transition operating in the slave sub-mode to operating in the master sub-mode in response to receiving an audio stream from the audio device 403. For example, a speaker operating in the slave sub-mode may transition to operating in the master sub-mode when there is A2DP audio stream coming in from the second audio device 404. Further, if the A2DP audio stream ceases, the speaker may transition back to operating in the slave sub-mode. The slave speaker 410 may connect to a master speaker with the strongest signal source. For example, a slave speaker will only search for the strongest source until it does not receive any broadcasting audio stream from the original master speaker. In some examples, slave speaker 410 may be physically closer to transition speaker 408 than to master speaker 404, and may begin re-broadcasting the audio stream from transition speaker 408 when transition speaker 408 operates in the master sub-mode. As shown by terminated connection 422, slave speaker 410 may have previously rebroadcasting the audio stream from master speaker 404.

In any of the above modes (e.g., the normal mode, the master sub-mode of the broadcasting mode, and the slave sub-mode and the broadcasting mode), if a speaker is transitioning modes, the speaker may briefly switch to the transient mode. The transient mode is an intermediate sub-state of the broadcasting mode. For example, the speaker may be waiting for a response from an external device (e.g., such as an audio device) before transitioning modes. For example, once the speaker gets the response from the external device, it ends the mode transition. The transient mode may be unstable, as all the messages transmitted may be asynchronous in the system. For example, state switching is not allowed to proceed in the unstable mode. Once the speaker returns to a stable mode, the speaker may switch to the target mode automatically. For example, the speaker may enter the transient mode in order to transition between the master sub-mode of the broadcasting mode and the slave sub-mode of the broadcasting mode. In some embodiments, the speaker may signal to a user that it is operating in the transient modes (e.g., is transitioning between stable modes) via an audio tone, a notification light, an audio message, or another user feedback method. For example, when the speaker enters the transient mode in order to transition between the master sub-mode and the slave sub-mode, the speaker may emit a distinctive tone, in order to signal the transition to the user.

Thus, a speaker according to an embodiment of the present disclosure may switch between the master and slave seamlessly and automatically without reset. All role definition may occur automatically without user intervention, in some examples. A method for transitioning between the normal mode and the broadcasting mode (e.g., including the master sub-mode and the slave sub-mode) is elaborated below with respect to FIG. 6. Note that in some examples, role definition may be pre-determined and may not change during speaker operation.

Additionally or alternatively, the speaker according to the present disclosure is provided with a button, and the broadcasting mode of the speaker can be turned on and off by pressing this button. Therefore, FIG. 5 shows an embodiment of a button layout 500, including a plurality of buttons, of a speaker of the present disclosure. For example, the button layout 500 may be included in any of the speakers referenced in FIGS. 1-4. Further, the plurality of buttons of button layout 500 may be used as the buttons 250 of speaker controller 201, shown in FIG. 2, in some examples. In some examples, one or more of the plurality of buttons may be included in a mobile application for controlling a speaker. In other examples, one of more of the plurality of buttons may be mechanically coupled to a speaker. For example, the plurality of buttons may provide inputs to the speaker controller of the speaker during speaker operation. As shown in FIG. 5, button layout 500 includes a play/pause button 502, a volume up button 504, a volume down button 506, a PartyBoost button 508, a power button 510, and a Bluetooth pairing button 512. Each of the buttons may be depressed (e.g., pressed, tapped, etc.) by a user in order to provide a user input to the speaker controller.

For example, depressing the power button 510 may cause a speaker controller to activate a speaker for use. As another example, depressing the play/pause button 502 may cause a paused audio stream to begin playing, or alternatively, may cause a playing audio stream to pause. Further, depressing volume up button 504 and volume down button 506 may cause a speaker controller to adjust a volume of the speaker, such as by adjusting speaker gains. As another example, depressing the Bluetooth pairing button 512 may cause a speaker controller to pair with an audio device (e.g., such as audio device 102 of FIG. 1). For example, as shown in FIG. 1, audio device 102 is paired with speaker 104. Further, as shown in FIG. 3, master speaker 304 is paired with audio device 302. Pairing may allow bi-directional communication between two devices via a Bluetooth connection, or any other suitable wireless connection (e.g., such as WIFI, NFC, and the like). The PartyBoost button 508 may transition the speaker into and out of the broadcasting modes elaborated above with respect to FIGS. 3 and 4. For example, in response to an input from the PartyBoost button 508, the speaker enters the broadcasting mode, and may automatically switch between the master sub-mode and the slave sub-mode.

Figure 6:
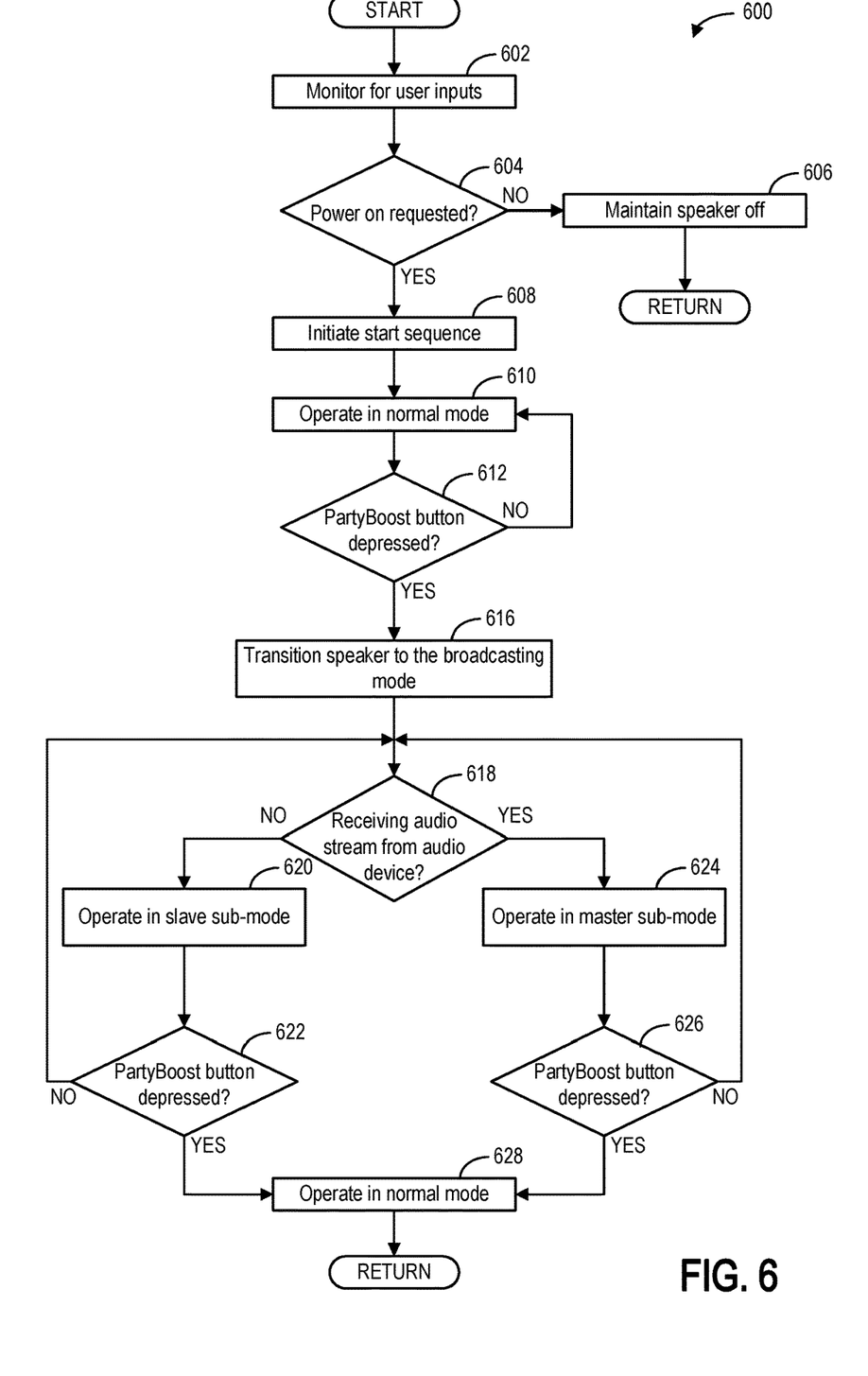
FIG. 6 is a flowchart illustrating a method for transitioning a speaker between operating in a normal mode and operating in a broadcasting mode, according to an embodiment of the present disclosure.

Therefore, FIG. 6 depicts a high-level flow chart of a method 600 for transitioning a speaker between operating in a normal mode and operating in a broadcasting mode, the broadcasting mode including a master sub-mode and a slave sub-mode, in accordance with one or more embodiments of the present disclosure. In particular, method 600 relates to transitioning a speaker, such as the first speaker 104 of FIG. 1, between modes based on an input from a PartyBoost button, such as PartyBoost button 508 of FIG. 5. Instructions for carrying out method 600 may be stored in non-transitory memory of a speaker controller (e.g., speaker controller 201 of FIG. 2). As such, method 600 may be executed by the processor based on the stored instructions and in conjunction with signals received by speaker system such as described hereinabove with reference to FIGS. 1-5. Note that the speaker is assumed to be in an inactive state (e.g., powered off) when method 600 begins.

Method 600 begins at 602. At 602, method 600 includes monitoring for inputs to the speaker system. For example, the speaker controller may monitor for inputs via a button press, such as the power button being depressed. As another example, the speaker controller may monitor for an input from an audio device, such as a command to power on.

At 604, method 600 determines whether a power on request has been received by the speaker. For example, if the speaker controller detects an input from a power button, the controller may indicate that the power button has been depressed. If the speaker controller does not detect an input from the power button, the controller may not indicate that the power button has been depressed.

If method 600 determines that a power on request has not been received at 604, method 600 continues to 606 and includes maintaining the speaker off. For example, the controller may not initiate a start sequence in order to activate the speaker, and the speaker may not operate in a normal mode. After maintaining the speaker off, method 600 may return.

If method 600 instead determines that the power button has been depressed at 604, method 600 continues to 608 and includes initiating a start sequence. For example, initiating the start sequence may include powering on the speaker and launching a software application for receiving and broadcasting an audio stream. Further, as an example, the speaker may signal power initiation to a user via at least one of emitting a tone, illuminating a light coupled to the speaker, reproducing a spoken audio message, and the like.

At 610, method 600 includes operating the speaker in a normal mode. For example, operating the speaker in the normal mode includes maintaining the speaker on and monitoring for an audio stream (e.g., such as A2DP) via a Bluetooth connection. For example, while operating in the normal mode, the speaker may pair with an audio device via a Bluetooth connection, such as shown in FIG. 1. Further, while operating in the normal mode, the speaker may receive an audio stream from the audio device, and may play the audio. As an example, the audio device may establish the Bluetooth connection with the speaker in response to a user input to the audio device. After establishing the Bluetooth connection, the speaker may be paired to the audio device, and may broadcast an audio stream from the audio device, the audio stream including a music file, for example. The audio device may retrieve the audio stream from a remote server, such as a cloud-based server for a music service, or the audio file may be stored in device memory.

At 612, method 600 includes determining whether the PartyBoost button has been depressed. For example, the controller may determine whether the PartyBoost button has been depressed based on a signal from the PartyBoost button (e.g., such as the PartyBoost button 508 shown in FIG. 5). In particular, the PartyBoost button may initiate the broadcasting mode as described above with respect to FIGS. 3 and 4. In some examples, the PartyBoost button may be a button coupled to the speaker, while in other examples, the PartyBoost button may be an input on an audio device communicatively coupled to the speaker. For example, rather than pressing a button coupled to the speaker, a user may initiate the broadcasting mode via the audio device, such as through an application running on the audio device.

If method 600 determines that the PartyBoost button has not been depressed at 612 (e.g., the user has not requested that the broadcasting mode be initiated), method 600 may return to 610 and continue to operate in the normal mode. For example, method 600 may continue to operate in the normal mode while monitoring to determine whether the PartyBoost button has been depressed.

If method 600 determines that the PartyBoost button has been depressed at 612, method 600 continues to 616 and includes transitioning the speaker to the broadcasting mode. As an example, a single press of the button of such PartyBoost button may start the initialization of the broadcasting mode of the speaker. As an example, the application layer of the speaker controller is configured to enable this initialization function, including such as to receive the button press events, determine the states of the audio playing, and decide between operating in the master sub-mode and the slave sub-mode. Further, a single press of the button of such PartyBoost button may further initiate the Broadcast State Machine Initialization.

At 618, method 600 includes determining whether audio is already playing on the speaker. For example, once the PartyBoost button on the speaker is pressed while operating in the normal mode, depending on the current audio playing state, the speaker will enter the master sub-mode of the broadcasting mode if audio is playing on the speaker, and the speaker will enter the slave sub-mode of the broadcasting mode if audio is not playing on the speaker. For example, the speaker may have received an audio stream while operating in the normal mode at 610, and may be reproducing the audio stream when the request to enter the broadcasting mode is received.

If method 600 determines that audio is not already playing at 618, method 600 continues to 620 and includes operating in the slave sub-mode of the broadcasting mode. For example, after pressing the PartyBoost button on the speaker, if no music is playing (e.g., via Bluetooth A2DP), the speaker may enter the transient mode in order to transition the slave sub-mode. If the slave role has been initialized already, it enters the slave sub-mode directly. For example, if the master role has been initialized already, the controller may destroy the master role before initializing the slave mode. When the initialization ends, the speaker enters the slave sub-mode. For example, the slave sub-mode is a stable sub-state of the broadcasting mode. The speaker operates in this slave sub-mode as a slave speaker in order to receive audio stream from the master speaker of the broadcasting system. As an example, as shown in the embodiments shown in FIGS. 3 and 4, the speaker in the slave sub-mode may receive the re-broadcasted audio stream from a speaker operating in the master sub-mode (e.g., a master speaker re-broadcasting an audio stream). As another example, the speaker in the slave sub-mode may not receive re-broadcasted audio if no speaker is operating in the master sub-mode in order to re-broadcast audio.

At 622, method 600 determines whether the PartyBoost button has been pressed again. For example, the controller may determine whether the PartyBoost button has been pressed based on a signal from the PartyBoost button and/or a signal from the audio device.

If, at 622, method 600 determines that the PartyBoost button has not been depressed, method 600 may return to 618 and again determine whether the speaker is receiving an audio stream from an audio device. For example, if the speaker is not receiving an audio stream from an audio device, the speaker may continue to be assigned a slave role, and may continue to rebroadcast an audio stream from a master speaker operating in the master sub-mode of the broadcasting mode. However, if the speaker is determined to be receiving an audio stream from the audio device, the speaker may transition to operating in the master mode as described below with respect to 624.

If method 600 determines that the PartyBoost button has been depressed against at 622, method 600 continues to 628 and includes returning to operating in the normal mode as described with respect to 610. Method 600 may then return.

However, if method 600 determines that audio is already playing at 618, method 600 continues to 624 and includes operating in the master sub-mode of the broadcasting mode. For example, in response to pressing the PartyBoost button on the speaker while music is playing, the speaker first enters the transient mode and then transitions to the master sub-mode. For example, the controller may initialize the speaker for re-broadcasting the audio stream to speakers operating in the slave sub-mode of the broadcasting mode. If the master role has been initialized already, it enters the master sub-mode directly. Further, if the slave role has been initialized already, the controller may destroy the slave role before initializing the master mode. When the initialization ends, the speaker enters the master sub-mode. For example, while operating in the master sub-mode, the speaker is designated as a master speaker, and may re-broadcast the audio stream to at least one slave speakers, as shown in FIGS. 3 and 4. In addition, the speaker in the master sub-mode may scan other applications so as to synchronize information therebetween.

At 626, method 600 includes determining whether the PartyBoost button has been depressed an additional time. For example, the speaker controller may determine whether the PartyBoost button has been depressed an additional time based on a signal from the PartyBoost button. As another example, the speaker controller may determine whether an audio device has transmitted a command equivalent to depressing the PartyBoost button, such as via an application running on the audio device.

If method 600 determines at 626 that the PartyBoost button has not been depressed an additional time, the speaker may return to 618 and determine whether the speaker is receiving an audio stream from the audio device. For example, if the speaker operating in the master sub-mode determines that the speaker is not receiving an audio stream the speaker may transition to operating in the slave sub-mode as described above with respect to 620.

If method 600 determines at 626 that the PartyBoost button has been depressed an additional time, method 600 may continue to 628 and return to operating in the normal mode. For example, the speaker may not broadcast the audio stream to a slave speaker. Method 600 may then return.

In this way, the speaker may switch dynamically and automatically between the master sub-mode of the broadcasting mode and the slave sub-mode of the broadcasting mode without any user input. For example, when a speaker operating in the master mode no longer receives an audio stream from the audio device, the speaker may switch to the slave sub-mode automatically. Conversely, once the A2DP music is resumed, the speaker will switch to the master sub-mode automatically. For example, if the speaker initially operates in the slave sub-mode, it will switch to the master mode automatically when an audio device begins directly providing an audio stream via Bluetooth. The audio stream coming in via A2DP means that a Bluetooth connection to this speaker has been established, such as to a smart device playing the A2DP audio stream. For example, to switch the speaker to the master sub-mode from the slave sub-mode, the speaker enters the transient mode first and destroys the slave role. As another example, to switch the speaker to the slave sub-mode from the master sub-mode, the speaker first enters a transient mode and destroys the master role.

In another embodiment, each of the speakers may be designated as a master speaker or a slave speaker in advance, and may operate accordingly upon entering the broadcasting mode. For example, a first speaker may be designated as a master speaker, and a second speaker may be designated a slave speaker. In some examples, this designation may be performed by a user via an application running on the audio device. In other examples, the user may input a series of button presses to each speaker in order to configure each speaker for one of the master role or the slave role. Thus, upon initiating the broadcasting mode, each speaker may operate in the sub-mode of the broadcasting mode it has been configured to perform. Thus, a speaker configured for the master role may operate in the master sub-mode, may receive an audio stream from the audio device, and may re-broadcast the audio stream to each speaker operating in the slave sub-mode of the broadcasting mode.

In this way, an audio stream from an audio device may be broadcasted to a plurality of speakers via a Bluetooth connection, which may increase customer satisfaction. For example, each of the plurality of speakers may be provided with a broadcasting mode, including a master sub-mode and a slave sub-mode. As such, a first speaker operating in the master sub-mode may receive an audio stream from an audio device, and may transmit the audio stream to a second speaker operating the slave sub-mode of the broadcasting mode, so that each of the first speaker and the second speaker may acoustically reproduce. In particular, only one speaker may be communicatively coupled to the audio stream source (e.g., the audio device), while multiple speakers operating in the broadcasting mode may reproduce the audio stream. Further, by providing a PartyBoost button for transitioning between the broadcasting mode and a normal mode, an ease of use of the speaker may be increased.

The technical effect of providing a plurality of speakers with a broadcasting mode is that each of the plurality of speakers may reproduce an audio stream substantially simultaneously, with only one speaker of the plurality of speakers communicatively coupled to the audio stream source, such as an audio device.

The disclosure also provides support for a method, comprising: responsive to a first speaker of a plurality of speakers receiving a first audio stream from a first audio device and a request to enter a broadcasting mode, operating the first speaker in a master sub-mode of the broadcasting mode by: re-broadcasting the first audio stream from the first audio device via a second speaker of the plurality of speakers operating in a slave sub-mode of the broadcasting mode, the second speaker not receiving the first audio stream from the first audio device. In a first example of the method, the request to enter the broadcasting mode is based on an input from a button coupled to the first speaker. In a second example of the method, optionally including the first example, the method further comprises: re-broadcasting the first audio stream from the first audio device via a third speaker of the plurality of speakers operating in the slave sub-mode of the broadcasting mode, the third speaker not receiving the first audio stream from the first audio device. In a third example of the method, optionally including the first and second examples, the method further comprises: responsive to the third speaker receiving a second audio stream from a second audio device, operating the third speaker in the master sub-mode of the broadcasting mode by: not re-broadcasting the first audio stream from the first speaker, and rebroadcasting the second audio stream from the second audio device via a fourth speaker operating in the slave sub-mode, the fourth speaker not receiving the first audio stream from the first audio device and not receiving the second audio stream from the second audio device, a distance between the fourth speaker and the third speaker less than a distance between the fourth speaker and the first speaker. In a fourth example of the method, optionally including the first through third examples, each of the first speaker and the second speaker can be switched between the master sub-mode of the broadcasting mode and the slave sub-mode of the broadcasting mode while operating in the broadcasting mode. In a fifth example of the method, optionally including the first through fourth examples, the first audio stream is A2DP audio stream. In a sixth example of the method, optionally including the first through fifth examples, the broadcasting mode further comprises a transient mode, during which one of the plurality of speakers is waiting for an event. In a seventh example of the method, optionally including the first through sixth examples, the first audio device is one of a mobile phone, a tablet, a smart watch, a smart television, and laptop computer. In an eighth example of the method, optionally including the first through seventh examples, each of the plurality of speakers are portable speakers configured to connect to one or more devices via Bluetooth.

The disclosure also provides support for a method for a computing system, comprising: transitioning between operating a first speaker in a normal mode and operating the first speaker in a broadcasting mode, the broadcasting mode including a master sub-mode and a slave sub-mode. In a first example of the method, operating the first speaker in the master sub-mode of the broadcasting mode includes re-broadcasting an audio stream from an audio device to at least one other speaker operating in the slave sub-mode of the broadcasting mode via a wireless connection. In a second example of the method, optionally including the first example, operating the first speaker in the slave sub-mode of the broadcasting mode includes: responsive to receiving the audio stream from the audio device via a second speaker operating in the master sub-mode of the broadcasting mode, reproducing the audio stream, and responsive to not receiving the audio stream from the audio device via the second speaker operating in the master sub-mode of the broadcasting mode, not reproducing the audio stream. In a third example of the method, optionally including the first and second examples, operating the first speaker in the normal mode includes acquiring the audio stream from the audio device and reproducing the audio stream. In a fourth example of the method, optionally including the first through third examples, the method further comprises: responsive to receiving an input from a first button while the first speaker is operating in the normal mode and receiving the audio stream from the audio device, transitioning the first speaker to the master sub-mode of the broadcasting mode, and responsive to receiving the input from the first button while the first speaker is operating in the normal mode and not receiving the audio stream from the audio device, transitioning the first speaker to the slave sub-mode of the broadcasting mode. In a fifth example of the method, optionally including the first through fourth examples, the method further comprises: responsive receiving the input from the first button while the first speaker is operating in one of the master sub-mode of the broadcasting mode and the slave sub-mode of the broadcasting mode, transitioning the first speaker to operating in the normal mode. In a sixth example of the method, optionally including the first through fifth examples, the audio device is one of a mobile phone, a laptop computer, a tablet computer, a smart watch, a pair of smart glasses, a smart television, and an MP3 player.

The disclosure also provides support for a computing system, comprising: a first speaker, a processor communicatively coupled to the computing system, and a storage device storing instructions executable by the processor to: responsive to operating in a master sub-mode of a broadcasting mode, re-broadcasting an audio stream from an audio device to a second speaker, the second speaker not communicatively coupled to the audio device, and responsive to operating in a slave sub-mode of the broadcasting mode, receiving the audio stream from a third speaker, the third speaker receiving the audio stream from the audio device. In a first example of the system, operating in the master sub-mode of the broadcasting mode is responsive to the first speaker receiving the audio stream from the audio device, and operating in the slave sub-mode of the broadcasting mode is responsive to the first speaker not receiving the audio stream from the audio device. In a second example of the system, optionally including the first example, operating in the master sub-mode of the broadcasting mode includes: transmitting the audio stream to the second speaker via a wireless connection, and reproducing the audio stream via the second speaker while reproducing the audio stream via the first speaker. In a third example of the system, optionally including the first and second examples, the storage device includes further instructions executable by the processor to: responsive to the first speaker operating in the master sub-mode of the broadcasting mode and not receiving the audio stream from the audio device, transitioning to operating in the slave sub-mode.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the speaker controller 201 described with reference to FIG. 2. The methods may be performed by executing stored instructions with one or more logic devices (e.g., processors) in combination with one or more additional hardware elements, such as storage devices, memory, hardware network interfaces/antennae, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and subcombinations of the various systems and configurations, and other features, functions, and/or properties disclosed.

The systems may include additional or different logic and may be implemented in many different ways. A controller may be implemented as a microprocessor, microcontroller, application specific integrated circuit (ASIC), discrete logic, or a combination of these and/or other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instruction sets may be parts of a single program, separate programs, or distributed across several memories and processors. The systems may be included in a wide variety of electronic devices, including a cellular phone, a headset, a hands-free set, a speakerphone, communication interface, or an infotainment system.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
   responsive to a first speaker of a plurality of speakers receiving a first audio stream from a first audio device and a request to enter a broadcasting mode, operating the first speaker in a master sub-mode of the broadcasting mode by:
   re-broadcasting the first audio stream from the first audio device via a second speaker of the plurality of speakers operating in a slave sub-mode of the broadcasting mode, the second speaker not receiving the first audio stream from the first audio device;
   re-broadcasting the first audio stream from the first audio device via a third speaker of the plurality of speakers operating in the slave sub-mode of the broadcasting mode, the third speaker not receiving the first audio stream from the first audio device;
   responsive to the third speaker receiving a second audio stream from a second audio device, operating the third speaker in the master sub-mode of the broadcasting mode by:
   not re-broadcasting the first audio stream from the first speaker; and
   rebroadcasting the second audio stream from the second audio device via a fourth speaker operating in the slave sub-mode, the fourth speaker not receiving the first audio stream from the first audio device and not receiving the second audio stream from the second audio device, a distance between the fourth speaker and the third speaker less than a distance between the fourth speaker and the first speaker.

2. The method of claim 1, wherein the request to enter the broadcasting mode is based on an input from a button coupled to the first speaker.

3. The method of claim 1, wherein each of the first speaker and the second speaker can be switched between the master sub-mode of the broadcasting mode and the slave sub-mode of the broadcasting mode while operating in the broadcasting mode.

4. The method of claim 1, wherein the first audio stream is A2DP audio stream.

5. The method of claim 1, wherein the broadcasting mode further comprises a transient mode, during which one of the plurality of speakers is waiting for an event.

6. The method of claim 1, wherein the first audio device is one of a mobile phone, a tablet, a smart watch, a smart television, and laptop computer.

7. The method of claim 1, wherein each of the plurality of speakers are portable speakers configured to connect to one or more devices via Bluetooth.

8. A method for a computing system, comprising:
   transitioning between operating a first speaker in a normal mode and operating the first speaker in a broadcasting mode, the broadcasting mode including a master sub-mode and a slave sub-mode, wherein the first speaker is configured to automatically switch between the master sub-mode and the slave sub-mode;
   wherein operating the first speaker in the master sub-mode of the broadcasting mode includes re-broadcasting an audio stream from an audio device to at least one other speaker operating in the slave sub-mode of the broadcasting mode via a wireless connection; and
   wherein operating the first speaker in the slave sub-mode of the broadcasting mode includes:
   responsive to receiving the audio stream from the audio device via a second speaker operating in the master sub-mode of the broadcasting mode, reproducing the audio stream; and
   responsive to not receiving the audio stream from the audio device via the second speaker operating in the master sub-mode of the broadcasting mode, not reproducing the audio stream.

9. The method of claim 8, wherein operating the first speaker in the normal mode includes acquiring the audio stream from the audio device and reproducing the audio stream.

10. The method of claim 9, further comprising:
    responsive to receiving an input from a first button while the first speaker is operating in the normal mode and receiving the audio stream from the audio device, transitioning the first speaker to the master sub-mode of the broadcasting mode; and
    responsive to receiving the input from the first button while the first speaker is operating in the normal mode and not receiving the audio stream from the audio device, transitioning the first speaker to the slave sub-mode of the broadcasting mode.

11. The method of claim 10, further comprising:
    responsive to receiving the input from the first button while the first speaker is operating in one of the master sub-mode of the broadcasting mode and the slave sub-mode of the broadcasting mode, transitioning the first speaker to operating in the normal mode.

12. The method of claim 8, wherein the audio device is one of a mobile phone, a laptop computer, a tablet computer, a smart watch, a pair of smart glasses, a smart television, and an MP3 player.

13. A computing system, comprising:
    a first speaker;
    a processor communicatively coupled to the computing system; and a storage device storing instructions executable by the processor to:
- responsive to operating in a master sub-mode of a broadcasting mode, re-broadcasting a first audio stream from a first audio device to a second speaker, the second speaker not communicatively coupled to the first audio device; and
- responsive to operating in a slave sub-mode of the broadcasting mode, receiving a second audio stream from a third speaker, the third speaker receiving the audio stream from a second audio device;
- wherein each speaker is configured to automatically switch between the master sub-mode and the slave sub-mode.

14. The computing system of claim 13, wherein operating in the master sub-mode of the broadcasting mode is responsive to the first speaker receiving the first audio stream from the first audio device, and operating in the slave sub-mode of the broadcasting mode is responsive to the first speaker not receiving the first audio stream from the first audio device.

15. The computing system of claim 13, wherein operating in the master sub-mode of the broadcasting mode includes:
- transmitting the first audio stream to the second speaker via a wireless connection; and
- reproducing the first audio stream via the second speaker while reproducing the first audio stream via the first speaker.

16. The computing system of claim 13, wherein the storage device includes further instructions executable by the processor to:
- responsive to the first speaker operating in the master sub-mode of the broadcasting mode and not receiving the first audio stream from the first audio device, transitioning to operating in the slave sub-mode.

17. The method of claim 8, wherein when transitioning from normal to either the master sub-mode or the slave sub-mode, the first speaker enters a transient mode prior to initializing the master sub-mode or the slave sub-mode.

* * * * *